(12) United States Patent
Yang

(10) Patent No.: US 12,372,141 B2
(45) Date of Patent: Jul. 29, 2025

(54) BIDIRECTIONALLY ROTATABLE MECHANISM, BIDIRECTIONAL SANDER, AND BIDIRECTIONAL CLEANER

(71) Applicant: ZHEJIANG PRULDE ELECTRIC APPLIANCE CO., LTD., Zhejiang (CN)

(72) Inventor: Weiming Yang, Jinhua (CN)

(73) Assignee: ZHEJIANG PRULDE ELECTRIC APPLIANCE CO., LTD., Jinhua (CN)

( * ) Notice: Subject to any disclaimer, the term of this patent is extended or adjusted under 35 U.S.C. 154(b) by 0 days.

(21) Appl. No.: 19/024,670

(22) Filed: Jan. 16, 2025

(65) Prior Publication Data

US 2025/0155001 A1     May 15, 2025

Related U.S. Application Data

(63) Continuation of application No. PCT/CN2023/109599, filed on Jul. 27, 2023.

(30) Foreign Application Priority Data

Jul. 28, 2022 (CN) .......................... 202210900293.3

(51) Int. Cl.
| | |
|---|---|
| *F16H 3/70* | (2006.01) |
| *A47L 11/40* | (2006.01) |
| *B24B 23/02* | (2006.01) |
| *B24B 47/12* | (2006.01) |

(52) U.S. Cl.
CPC ............ *F16H 3/70* (2013.01); *A47L 11/4069* (2013.01); *B24B 47/12* (2013.01); *A47L 11/4038* (2013.01); *B24B 23/02* (2013.01)

(58) Field of Classification Search
CPC .... F16H 1/46; A47L 11/4069; A47L 11/4038; B24B 47/12; B24B 23/02
See application file for complete search history.

(56) References Cited

U.S. PATENT DOCUMENTS

| | | | |
|---|---|---|---|
| 9,366,317 B2 * | 6/2016 | Croce | ........................ F16H 1/46 |
| 10,536,054 B2 * | 1/2020 | Ta | ............................ F16H 57/02 |
| 2022/0299088 A1 * | 9/2022 | Huang | ................... F16H 57/043 |
| 2023/0027337 A1 * | 1/2023 | Ikuta | ........................ F16H 3/005 |

* cited by examiner

Primary Examiner — Huan Le
(74) Attorney, Agent, or Firm — Oliff PLC

(57) ABSTRACT

A bidirectionally rotatable mechanism, a bidirectional sander, and a bidirectional cleaner; the mechanism including an actuator, an inner and an outer shaft, the inner and outer shafts being actuated to rotate by the actuator, the outer shaft being sleeved outside the inner shaft; a speed reducer is arranged between an output shaft of the actuator and the inner shaft; two ends of the speed reducer are in transmission connection with the output shaft and the inner shaft, respectively; a first gear is arranged on an outer peripheral surface of the inner shaft; an outer transmission assembly in transmission connection with the outer shaft is arranged outside the inner shaft, the outer transmission assembly including a support element, an upper planetary carrier, a planetary gear meshing with the first gear, and a lower planetary carrier connected to the outer shaft, the planetary gear between the upper and the lower planetary carrier.

18 Claims, 5 Drawing Sheets

BIDIRECTIONALLY ROTATABLE MECHANISM, BIDIRECTIONAL SANDER, AND BIDIRECTIONAL CLEANER

FIELD

The present disclosure described herein relates to a bidirectionally rotatable mechanism, which relates to a transmission structure; in addition, the present disclosure also relates to a bidirectional sander and a bidirectional cleaner applying the mechanism.

BACKGROUND

A sander is a tool for sanding a wall surface or the like. Conventional sanders can only rotate unidirectionally, with marks left and dust created. The conventional sanders are strenuous to operate with low work efficiency and unsatisfactory sanding effect; in addition, they require repetitively sanding back and forth, which is a laborious work.

SUMMARY

A bidirectionally rotatable mechanism, a bidirectional sander, and a bidirectional cleaner are described herein. The bidirectional sander is bidirectionally rotatable with an improved sanding effect. The bidirectional cleaner is capable of performing a cleaning job in a bidirectional way with an improved cleaning effect.

The disclosure adopts a technical solution below:

a bidirectionally rotatable mechanism, comprising an actuator, an inner shaft, and an outer shaft, the inner shaft and the outer shaft being driven to rotate by the actuator, the outer shaft being sleeved outside the inner shaft, wherein a speed reducer is arranged between an output shaft of the actuator and the inner shaft; the speed reducer comprises an inner ring gear in which a reduction gear assembly is embedded, the reduction gear assembly comprising a planetary reduction gear meshing with the inner ring gear and a transmission shaft, the planetary reduction gear being in transmission connection with the output shaft, the transmission shaft being in transmission connection with the inner shaft; a first gear is arranged on an outer peripheral surface of the inner shaft; an outer transmission assembly in transmission connection with the outer shaft is disposed outside the inner shaft, the outer transmission assembly comprising a support element, an upper planetary carrier, a planetary gear meshing with the first gear, and a lower planetary carrier connected to the outer shaft; a support wheel is provided at a lower end of the support element; the upper planetary carrier is sleeved on an outer periphery of the support wheel; the planetary gear comprises a first gear portion and a second gear portion, the first gear portion meshing with the support wheel, the second gear portion meshing with the first gear, the planetary gear being arranged between the upper planetary carrier and the lower planetary carrier.

The disclosure offers the following benefits:

In this disclosure, the actuator is in transmission connection with the inner shaft; after the actuator is activated, it drives the inner shaft to rotate; a first gear is arranged on an outer peripheral surface of the inner shaft; an outer transmission assembly is sleeved outside the inner shaft, the outer transmission assembly comprising a support element, an upper planetary carrier, a planetary gear meshing with the first gear, and a lower planetary carrier meshing with the outer shaft; the planetary gear is disposed meshing with the first gear; a rotating direction of the planetary gear is counter to a rotating direction of the first gear; the lower planetary carrier rotates with the planetary gear; the lower planetary carrier is connected to the outer shaft; the lower planetary carrier drives the outer shaft to rotate; as such, the outer shaft and the inner shaft rotate in opposite directions, realizing bi-directional rotation. This implementation eliminates a need of repetitively sanding back and forth, leaves no marks during the sanding process, achieves a better sanding effect, and can effectively enhance sanding efficiency.

Additionally in this disclosure, the outer shaft can rotate reversely about the inner shaft via the outer transmission assembly only, which offers a simple transmission construction that facilitates installation and maintenance; meanwhile, with less transmission stages, this disclosure offers higher transmission efficiency with reduced energy consumption; moreover, since the outer transmission assembly is sleeved outside the inner shaft, the outer transmission assembly may maintain coaxial with the inner shaft; this disclosure offers a dense connection with reduced mounting footprint, so that the overall structure of this implementation is more compact and portable.

In some implementations, the reduction gear assembly comprises a first-stage planetary assembly and a second-stage planetary assembly, the first-stage planetary assembly comprising a securing disk and a first-stage planetary reduction gear mounted on the securing disk, the second-stage planetary assembly comprising a securing disk and a second-stage planetary reduction gear mounted on the securing disk, the output shaft being in transmission connection with the first-stage planetary reduction gear of the first-stage planetary assembly; a transmission gear is arranged at a bottom of the securing disk of the first-stage planetary assembly, the transmission gear meshing with the second-stage planetary reduction gear of the second-stage planetary assembly; and the transmission shaft is disposed at a bottom of the securing disk of the second-stage planetary assembly.

In some implementations, the transmission connection between the transmission shaft and the inner shaft is enabled via a coupling sleeve.

In some implementations, a connection portion is provided at a lower end of the transmission shaft and at an upper end of the inner shaft, respectively, and a connection hole fitted with the connection portion is provided on the coupling sleeve, the coupling sleeve enabling the transmission shaft and the inner shaft to rotate synchronously via fitting between the connection portion and the connection hole.

In some implementations, an outer rotary disk is provided at a bottom end of the outer shaft, an inner rotary disk is provided at a bottom end of the inner shaft, and the outer rotary disk is provided with a mounting cavity configured to receive the inner rotary disk.

In some implementations, a connector is provided at a lower end of the inner shaft; a plurality of bumps distributed at intervals are arranged on an outer peripheral surface of the connector; a snap-in hole fitted with the connector is provided on the inner rotary disk; a plurality of snap blocks distributed at intervals are arranged on a hole wall of the snap-in hole; and the snap blocks and the bumps are snap-fitted so that the inner rotary disk is connected to the inner shaft.

The disclosure further describes a bidirectional sander, comprising a sander powerhead, the bidirectionally rotatable mechanism noted supra being arranged in the sander powerhead.

The disclosure further describes a bidirectional cleaner, comprising a cleaner powerhead, the bidirectionally rotatable mechanism noted supra being arranged in the cleaner powerhead.

Other features and advantages of the disclosure will be described in detail through specific implementations below with reference to the accompanying drawings.

BRIEF DESCRIPTION OF THE DRAWINGS

Hereinafter, the disclosure will be described in further detail with reference to the accompanying drawings.

Figure 1:
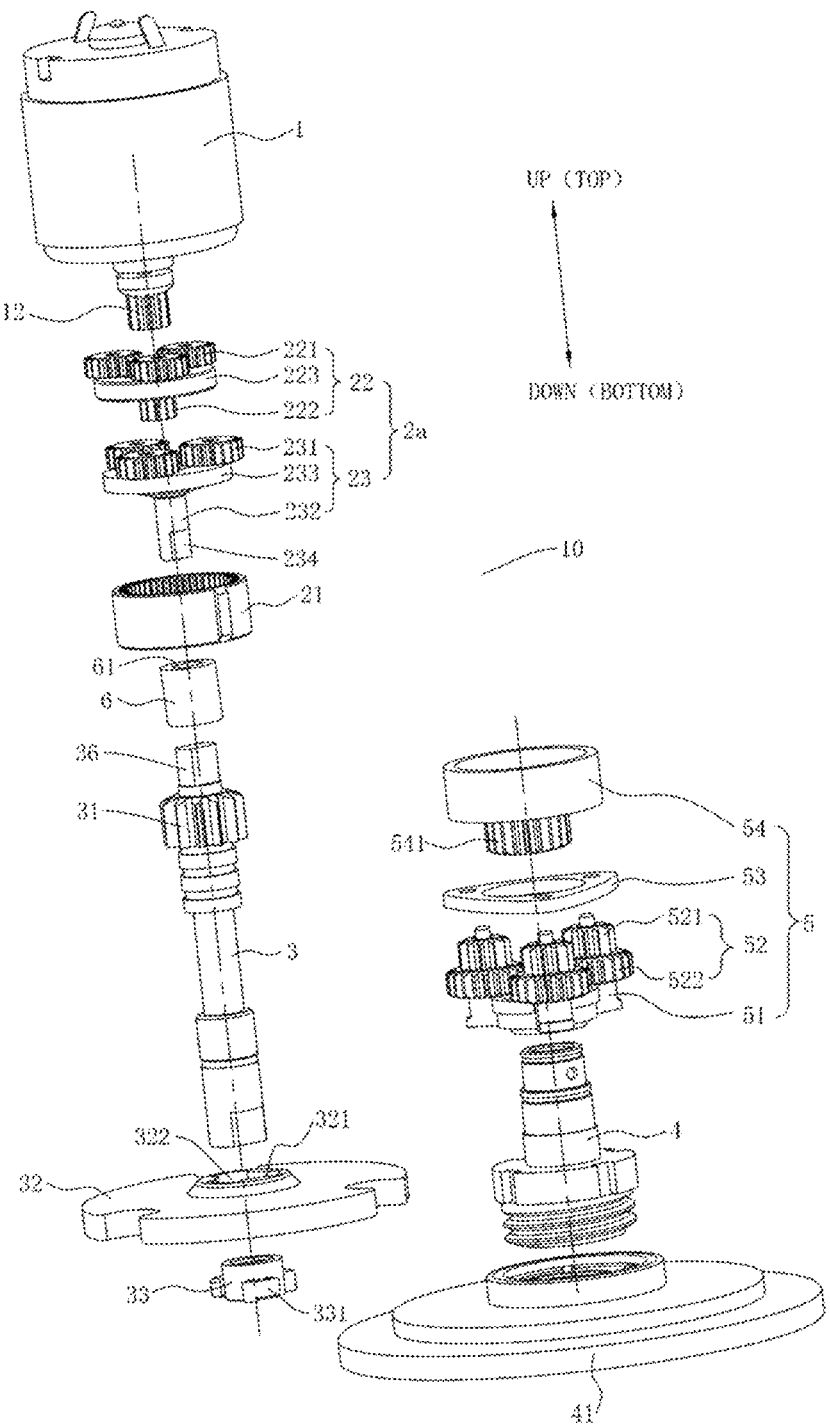
FIG. 1 is an exploded view of a bidirectionally rotatable mechanism according to a first implementation of the disclosure.
Figure 2:
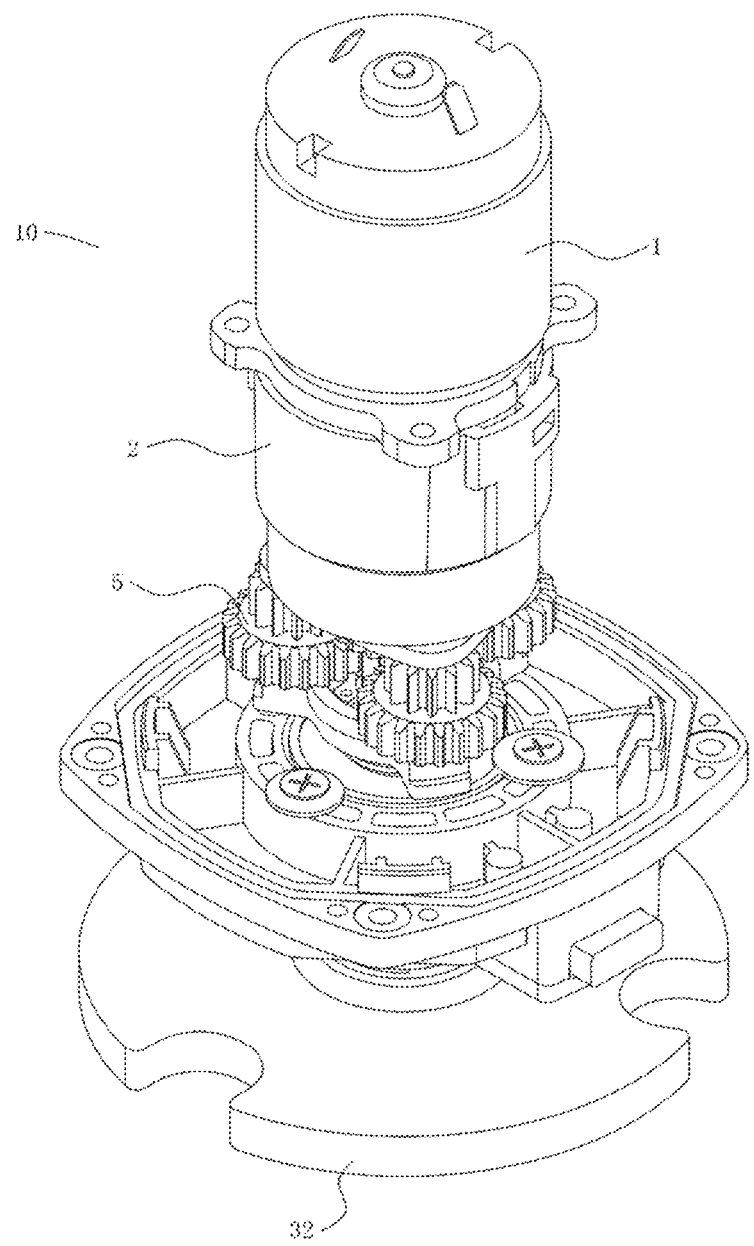
FIG. 2 is a structural view of the bidirectionally rotatable mechanism according to the first implementation of the disclosure.
Figure 3:
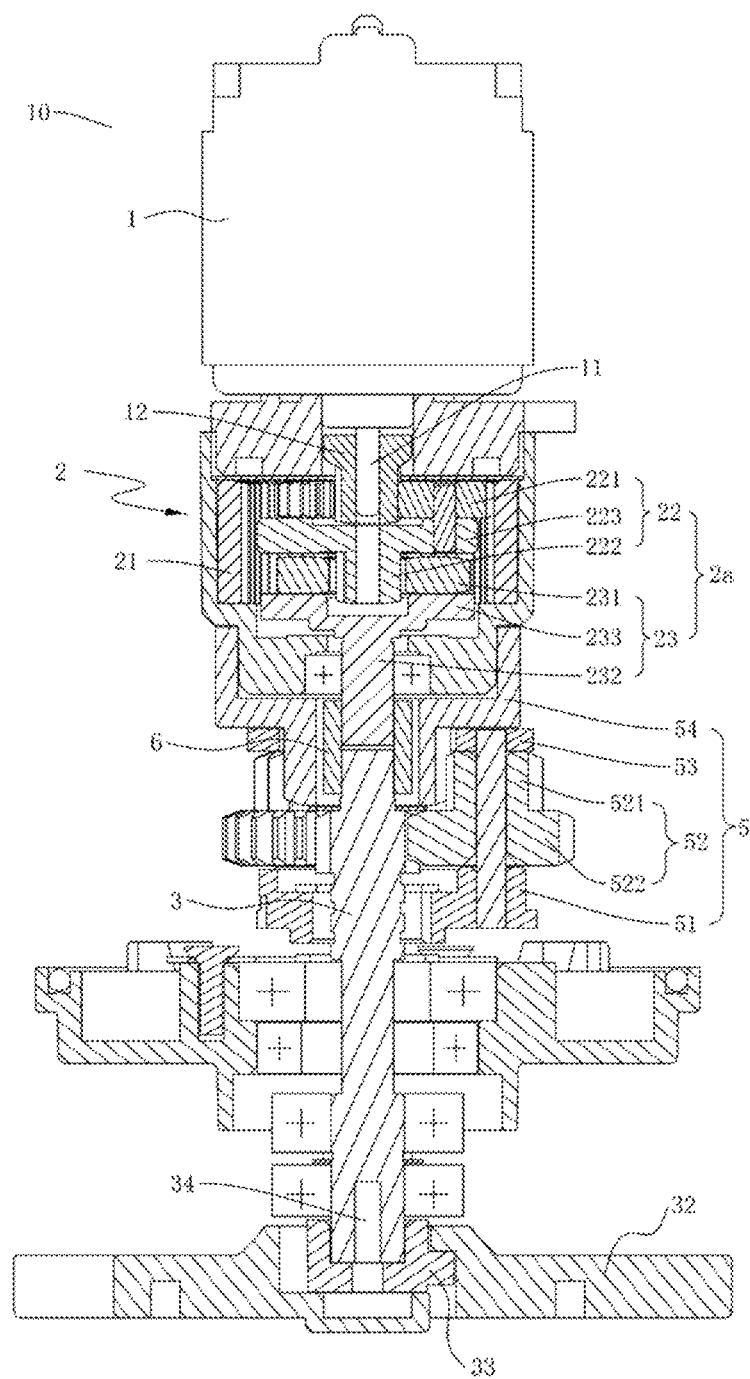
FIG. 3 is an axially sectional view of FIG. 2.
Figure 4:
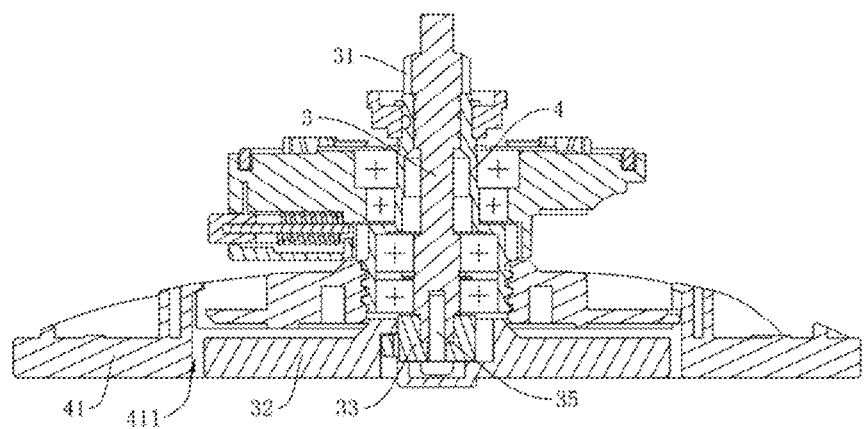
FIG. 4 is an axially sectional view of a partial structure of the bidirectionally rotatable mechanism according to the first implementation of the disclosure.
Figure 5:
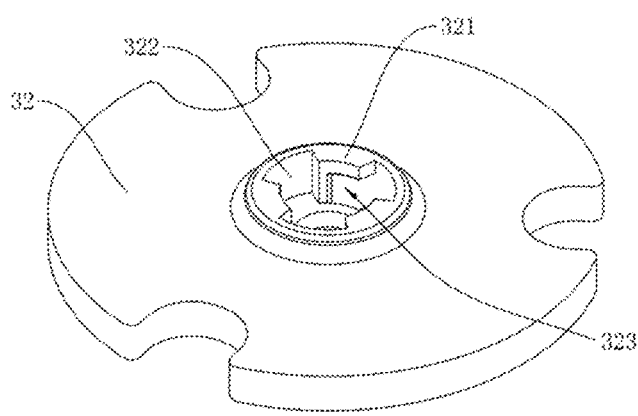
FIG. 5 is a structural view of an inner rotary disk according to the first implementation of the disclosure.

Reference Numerals: 10. bidirectionally rotatable mechanism;

1. actuator; 11. output shaft; 12. sun gear;
2. speed reducer; 2a. reduction gear assembly; 21. inner ring gear; 22. first-stage planetary assembly; 221. first-stage planetary reduction gear; 222. transmission gear; 23. second-stage planetary assembly; 231. second-stage planetary reduction gear; 232. transmission shaft; 223, 233. securing disk;
3. inner shaft; 31. first gear; 32. inner rotary disk; 321. snap block; 322. snap-in hole; 33. connector; 331. bump; 34. threaded hole; 35. screw; 36, 234. connection portion;
4. outer shaft; 41. outer rotary disk; 411. mounting cavity;
5. outer transmission assembly; 5a. stationary base; 51. lower planetary carrier; 52. planetary gear; 521. first gear portion; 522. second gear portion; 53. upper planetary carrier; 54. fixed gear; 541. support wheel;
6. coupling sleeve; 61. connection hole;
100. bidirectional sander; 110. sander powerhead;
200. bidirectional cleaner; 210. cleaner powerhead.

DETAILED DESCRIPTION OF EMBODIMENTS

Hereinafter, the technical solutions of the disclosure will be explained and illustrated through implementations with reference to the accompanying drawings. However, the implementations described herein are only some embodiments of the disclosure, not all of them. Other implementations obtained by those skilled in the art based on the examples in the implementations without exercise of inventive work all fall within the protection scope of the disclosure.

In the description of the disclosure, it needs to be understood that the orientational or positional relationships indicated by the terms "center," "longitudinal," "transverse," "length," "width," "thickness", "upper," "lower," "front," "rear," "left," "right," "vertical," "horizontal," "top," "bottom," "inner," "clockwise," "counterclockwise," etc. are orientational and positional relationships based on the drawings, which are intended only for facilitating description of the disclosure and simplifying relevant illustrations, not for indicating or implying that the devices or elements compulsorily possess those specific orientations and are compulsorily configured and operated with those specific orientations; therefore, such terms should not be construed as limitations to the disclosure.

Besides, the terms "first" and "second" are only used for descriptive purposes, which shall not be construed as indicating or implying relative importance or implicitly indicating the amount of a referred to technical feature. Therefore, the features limited by "first" and "second" may explicitly or implicitly include one or more of such features. In the description of the disclosure, unless otherwise indicated, "plurality" indicates two or above.

In the disclosure, unless otherwise explicitly provided and limited, the terms such as "mount," "connect," "couple," and "fix" should be understood broadly, which, for example, may refer to a fixed connection, a detachable connection, or an integral connection; which may be a mechanical connection or an electrical connection; which may be a direct connection or an indirect connection via an intermediate medium; which may also be a communication between the insides of two elements. To a person of normal skill in the art, specific meanings of the above terms in the disclosure may be construed based on specific situations.

First Implementation

As illustrated in FIGS. 1 through 5, a bidirectionally rotatable mechanism 10 described herein comprises an actuator 1, an inner shaft 3, and an outer shaft 4, the inner shaft 3 and the outer shaft 4 being actuated to rotate by the actuator 1, the outer shaft 4 being sleeved outside the inner shaft 3; a speed reducer 2 is arranged between an output shaft 11 of the actuator 1 and the inner shaft 3, two ends of the speed reducer 2 being in transmission connection with the output shaft 11 and the inner shaft 3, respectively; a first gear 31 is arranged on an outer peripheral surface of the inner shaft 3; an outer transmission assembly 5 in transmission connection with the outer shaft 4 is sleeved on the inner shaft 3. The outer transmission assembly 5 comprises a support element 54, an upper planetary carrier 53, a planetary gear 52, and a lower planetary carrier 51, the upper planetary carrier 53 being arranged between the planetary gear 52 and the support element 54, the planetary gear 52 being arranged between the upper planetary carrier 53 and the lower planetary carrier 51; a support wheel 541 is provided at a lower end of the support element 54, the upper planetary carrier 53 being sleeved on an outer periphery of the support wheel 541. In this implementation, three planetary gears 52 are provided in total, the three planetary gears 52 being distributed at even intervals along a circumferential direction of the first gear 31, the planetary gear 52 comprising a first gear portion 521 and a second gear portion 522, a diameter of the first gear portion 521 being less than that of the second gear portion 522, the first gear portion 521 being disposed on top of the second gear portion 522, the first gear portion 521 and the support wheel 541 meshing with each other, the second gear portion 522 and the first gear 31 meshing with each other; in this implementation, the first gear portion 521 and the second gear portion 522 are formed into a one-piece structure.

In this implementation, when the inner shaft 3 is rotating, the first gear 31 rotates synchronously with the inner shaft 3, the three planetary gears 52 rotate relative to the first gear 31 while revolving about the first gear 31 in a direction counter to the rotating direction of the first gear 31. Since the upper planetary carrier 53 and the lower planetary carrier 51 are both connected to the planetary gears 52, the upper planetary carrier 53 and the lower planetary carrier 51 revolve with the planetary gears 52; and since the lower planetary carrier 51 is connected to the outer shaft 4, the lower planetary carrier 51 drives the outer shaft 4 to rotate synchronously; as such, the outer shaft 4 and the inner shaft 3 rotate in different directions, respectively, realizing bi-directional rotation. This implementation eliminates a need of repetitively sanding back and forth, leaves no marks during the sanding process, achieves a better sanding effect, and can efficiently enhance sanding efficiency.

Additionally in this implementation, the outer shaft 4 can rotate reversely relative to the inner shaft 3 via the outer transmission assembly 5 only, which offers a simple transmission construction that facilitates installation and maintenance; meanwhile, with less transmission stages, this implementation offers higher transmission efficiency with reduced energy consumption; moreover, since the outer transmission assembly 5 is sleeved outside the inner shaft 3, the transmission assembly 5 may maintain coaxial with the inner shaft 3, so that this implementation offers a dense connection with reduced mounting footprint, so that the overall structure of this implementation is more compact and portable.

In this implementation, the speed reducer 2 comprises an inner ring gear 21 and a reduction gear assembly 2a arranged on an inner periphery of the inner ring gear 21. The reduction gear assembly 2a comprises a first-stage planetary assembly 22 and a second-stage planetary assembly 23, the first-stage planetary assembly 22 comprising a securing disk 223 and a first-stage planetary reduction gear 221 mounted on top of the securing disk 223, the second-stage planetary assembly 23 comprising a securing disk 233 and a second-stage planetary reduction gear 231 mounted on top of the securing disk 233. The first-stage planetary assembly 22 comprises the first-stage planetary reduction gear 221. The first-stage planetary reduction gear 221 is disposed surrounding an outer periphery of the output shaft 11 and meshing with the inner ring gear 21; a sun gear 12 is sleeved on the output shaft 11, and the first-stage planetary reduction gear 221 also meshes with the sun gear 12. A transmission gear 222 is provided at a bottom of the securing disk 223 of the first-stage planetary assembly 22, the second-stage planetary assembly 23 comprises the second-stage planetary reduction gear 231, the transmission gear 222 meshes with the second-stage planetary reduction gear 231, and the second-stage planetary reduction gear 231 also meshes with the inner ring gear. A transmission shaft 232 is provided at a bottom of the securing disk 233 of the second-stage planetary assembly 23; a coupling sleeve 6 is arranged between the transmission shaft 232 and the inner shaft 3 to realize transmission connection therebetween. Specifically, a connection portion 234, 36 is provided at a lower end of the transmission shaft 232 and at an upper end of the inner shaft 3, respectively, a connection hole 61 fitted with the connection portion 234, 36 is provided on the coupling sleeve 6, and the coupling sleeve 6 enables the inner shaft 3 and the transmission shaft 232 to rotate synchronously via fitting between the connection portion 234, 36 and the connection hole 61. The actuator 1, once being activated, actuates the output shaft 11 to rotate; the rotating output shaft 11 drives, via the sun gear 12, the first-stage planetary reduction gear 221 to rotate, the rotating first-stage planetary reduction gear 221 drives, via the securing disk 223, the transmission gear 222 to rotate, the rotating transmission gear 222 drives the second-stage planetary reduction gear 231 to rotate, the rotating second-stage planetary reduction gear 231 drives, via the securing disk 233, the transmission shaft 232 to rotate, the rotating transmission shaft 232 drives, via the coupling sleeve 6, the inner shaft 3 to rotate synchronously, the rotating inner shaft 3 drives, via the outer transmission assembly 5, the outer shaft 4 to rotate reversely, whereby power is transmitted from the actuator 1 to the inner shaft 3 and the outer shaft 4; meanwhile, the speed reducer 2 can also reduce a rotation speed of the inner shaft 3 to a reasonable extent.

In this implementation, an outer rotary disk 41 is provided at a bottom end of the outer shaft 4, an inner rotary disk 32 is provided at a bottom end of the inner shaft 3, and a mounting cavity 411 configured to accommodate the inner rotary disk 32 is provided in a central portion of the outer rotary disk 41; the inner rotary disk 32 is mounted in the central portion of the outer rotary disk 41, the inner rotary disk 32 rotates in a direction reverse to that of the outer rotary disk 41; in addition, the inner rotary disk 32 maintains coaxial with the outer rotary disk 41, an underside of the inner rotary disk 32 is substantially flush with an underside of the outer rotary disk 41; a threaded hole 34 is provided on a lower end of the inner shaft 3; the inner shaft 3 and the inner rotary disk 32 are detachably connected via a connector 33; the connector 33 is connected to the lower end of the inner shaft 3 via fitting between a screw 35 and the threaded hole 34; a plurality of bumps 331 distributed at intervals are arranged on an outer peripheral surface of the connector 33; a snap-in hole 322 adapted to the connector 33 is provided at a central portion of the inner rotary disk 32, snap blocks 321 are provided on a hole wall of the snap-in hole 322, the snap blocks 321 being formed with snap-in slots 323 fitted with the bumps 331; by fitting the bumps 331 into the snap-in slots 323, connection between the inner shaft 3 and the inner rotary disk 32 is realized. In addition, the outer rotary disk 41 may be detachably connected to the lower end of the outer shaft 4 in a threaded-fit manner, a screwing direction of the threaded-fit being exemplarily set reverse to the rotating direction of the outer rotary disk 41.

Figure 6:
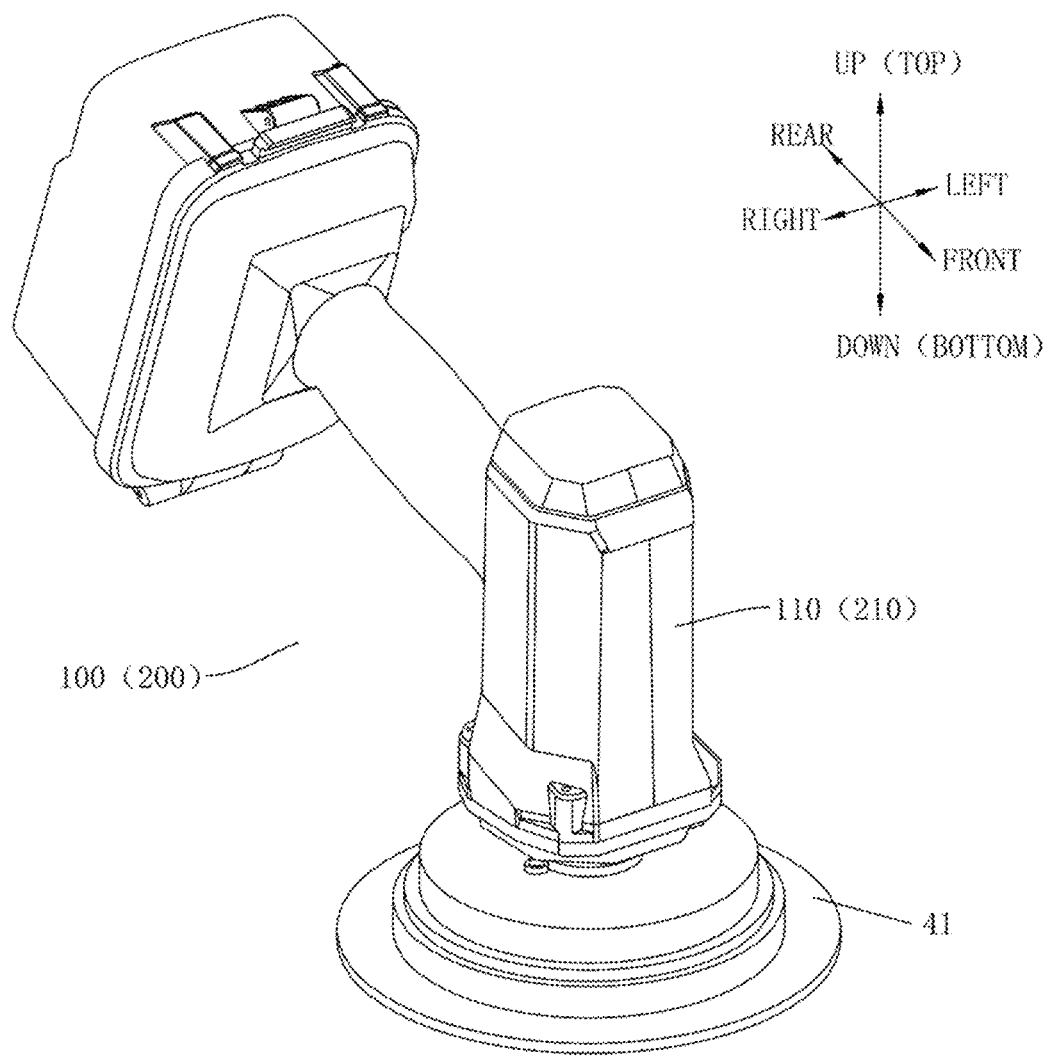
FIG. 6 is a structural schematic view of a bidirectional sander (or bidirectional cleaner) according to the first implementation of the disclosure.

Referring to FIG. 6, this implementation further describes a bidirectional sander 100. The bidirectional sander 100 comprises: a sander powerhead 110, the bidirectionally rotatable mechanism 10 described supra being arranged in the sander powerhead 110. The bidirectionally rotatable mechanism 10 comprises an actuator 1, a speed reducer 2, an inner shaft 3, an outer shaft 4, and an outer transmission assembly 5; an inner rotary disk 32 is connected to a lower end of the inner shaft 3; an outer rotary disk 41 is connected to a lower end of the outer shaft 4. The bidirectional sander 100 in this implementation realizes bidirectional rotation output, so that the bidirectional sander 100 needn't repetitively sand back and forth, which leaves no marks during the sanding process, achieves a better sanding effect, and can effectively enhance sanding efficiency. To achieve a sanding purpose, a member with sanding functionality, such as emery paper and emery wheel, may be attached to the underside of the inner rotary disk 32 and the underside of the outer rotary disk 41.

This implementation further describes a bidirectional cleaner 200. The bidirectional cleaner 200 comprises a cleaner powerhead 210, the bidirectionally rotatable mechanism 10 as described supra being arranged in the cleaner powerhead 210. The bidirectionally rotatable mechanism 10 comprises an actuator 1, a speed reducer 2, an inner shaft 3, an outer shaft 4, and an outer transmission assembly 5; an inner rotary disk 32 is connected to a lower end of the inner shaft 3; and an outer rotary disk 41 is connected to a lower end of the outer shaft 4. The bidirectional cleaner 200 in this implementation realizes bidirectional rotation output, so that the bidirectional cleaner needn't repetitively perform a cleaning action back and forth, which leaves no marks during the cleaning process, achieves a better cleaning effect, and can effectively enhance cleaning efficiency. To achieve a cleaning purpose, a member with cleaning functionality, such as bristles, a scouring pad, and sponge, may be attached to the underside of the inner rotary disk 32 and the underside of the outer rotary disk 41.

What have been described above are only example implementations of the disclosure; however, the protection scope of the disclosure is not limited thereto. A person skilled in the art should understand that the disclosure includes, but is not limited to, the contents described in the drawings and the embodiments. Any modifications without departing from the functions and structural principles of the disclosure will be included within the scope of the claims.

I claim:

1. A bidirectionally rotatable mechanism, comprising an actuator, an inner shaft, and an outer shaft, the inner shaft and the outer shaft being actuated to rotate by the actuator, the outer shaft being sleeved outside the inner shaft, wherein a speed reducer is arranged between an output shaft of the actuator and the inner shaft; the speed reducer comprises an inner ring gear in which a reduction gear assembly is embedded, the reduction gear assembly comprising a planetary reduction gear meshing with the inner ring gear and a transmission shaft, the planetary reduction gear being in transmission connection with the output shaft, the transmission shaft being in transmission connection with the inner shaft; a first gear is arranged on an outer peripheral surface of the inner shaft; an outer transmission assembly in transmission connection with the outer shaft is arranged outside the inner shaft, the outer transmission assembly comprising a support element, an upper planetary carrier, a planetary gear meshing with the first gear, and a lower planetary carrier connected to the outer shaft; a support wheel is provided at a lower end of the support element, the upper planetary carrier being sleeved on an outer periphery of the support wheel; the planetary gear comprises a first gear portion and a second gear portion, the first gear portion meshing with the support wheel, the second gear portion meshing with the first gear; and the planetary gear is arranged between the upper planetary carrier and the lower planetary carrier.

2. The bidirectionally rotatable mechanism according to claim 1, wherein the reduction gear assembly comprises a first-stage planetary assembly and a second-stage planetary assembly, the first-stage planetary assembly comprising a securing disk and a first-stage planetary reduction gear mounted on the securing disk, the second-stage planetary assembly comprising a securing disk and a second-stage planetary reduction gear mounted on the securing disk, the output shaft being in transmission connection with the first-stage planetary reduction gear of the first-stage planetary assembly; a transmission gear is arranged at a bottom of the securing disk of the first-stage planetary assembly, the transmission gear meshing with the second-stage planetary reduction gear of the second-stage planetary assembly; and the transmission shaft is disposed at a bottom of the securing disk of the second-stage planetary assembly.

3. The bidirectionally rotatable mechanism according to claim 2, wherein transmission connection between the transmission shaft and the inner shaft is enabled by a coupling sleeve.

4. The bidirectionally rotatable mechanism according to claim 3, wherein a connection portion is provided at a lower end of the transmission shaft and at an upper end of the inner shaft, respectively, and a connection hole fitted with the connection portion is provided on the coupling sleeve, the coupling sleeve enabling the transmission shaft and the inner shaft to rotate synchronously via fitting between the connection portion and the connection hole.

5. A bidirectional sander, comprising a sander powerhead, wherein the bidirectionally rotatable mechanism according to claim 4 is arranged in the sander powerhead.

6. A bidirectional cleaner, comprising a cleaner powerhead, wherein the bidirectionally rotatable mechanism according to claim 4 is arranged in the cleaner powerhead.

7. A bidirectional sander, comprising a sander powerhead, wherein the bidirectionally rotatable mechanism according to claim 3 is arranged in the sander powerhead.

8. A bidirectional cleaner, comprising a cleaner powerhead, wherein the bidirectionally rotatable mechanism according to claim 3 is arranged in the cleaner powerhead.

9. A bidirectional sander, comprising a sander powerhead, wherein the bidirectionally rotatable mechanism according to claim 2 is arranged in the sander powerhead.

10. A bidirectional cleaner, comprising a cleaner powerhead, wherein the bidirectionally rotatable mechanism according to claim 2 is arranged in the cleaner powerhead.

11. The bidirectionally rotatable mechanism according to claim 1, wherein an outer rotary disk is provided at a bottom end of the outer shaft, an inner rotary disk is provided at a bottom end of the inner shaft, and the outer rotary disk is provided with a mounting cavity configured to receive the inner rotary disk.

12. A bidirectional sander, comprising a sander powerhead, wherein the bidirectionally rotatable mechanism according to claim 11 is arranged in the sander powerhead.

13. The bidirectionally rotatable mechanism according to claim 11, wherein a connector is provided at a lower end of the inner shaft; a plurality of bumps distributed at intervals are arranged on an outer peripheral surface of the connector, a snap-in hole fitted with the connector is provided on the inner rotary disk, a plurality of snap blocks distributed at intervals are arranged on a hole wall of the snap-in hole, and the snap blocks and the bumps are snap-fitted so that the inner rotary disk is connected to the inner shaft.

14. A bidirectional sander, comprising a sander powerhead, wherein the bidirectionally rotatable mechanism according to claim 13 is arranged in the sander powerhead.

15. A bidirectional cleaner, comprising a cleaner powerhead, wherein the bidirectionally rotatable mechanism according to claim 13 is arranged in the cleaner powerhead.

16. A bidirectional cleaner, comprising a cleaner powerhead, wherein the bidirectionally rotatable mechanism according to claim 11 is arranged in the cleaner powerhead.

17. A bidirectional sander, comprising a sander powerhead, wherein the bidirectionally rotatable mechanism according to claim 1 is arranged in the sander powerhead.

18. A bidirectional cleaner, comprising a cleaner powerhead, wherein the bidirectionally rotatable mechanism according to claim 1 is arranged in the cleaner powerhead.

* * * * *